United States Patent
Griffin, Jr. et al.

(10) Patent No.: US 10,359,128 B2
(45) Date of Patent: Jul. 23, 2019

(54) LATTICE CONTROL CAGE FOR A REGULATOR

(71) Applicant: EMERSON PROCESS MANAGEMENT REGULATOR TECHNOLOGIES, INC., McKinney, TX (US)

(72) Inventors: James L. Griffin, Jr., McKinney, TX (US); James M. West, Dallas, TX (US); Nathan A. Quinn, McKinney, TX (US)

(73) Assignee: EMERSON PROCESS MANAGEMENT REGULATOR TECHNOLOGIES, INC., McKinney, TX (US)

(*) Notice: Subject to any disclaimer, the term of this patent is extended or adjusted under 35 U.S.C. 154(b) by 0 days.

(21) Appl. No.: 15/331,394

(22) Filed: Oct. 21, 2016

(65) Prior Publication Data

US 2018/0112800 A1    Apr. 26, 2018

(51) Int. Cl.
*F16K 3/24* (2006.01)
*F16K 47/08* (2006.01)
*F16K 47/14* (2006.01)

(52) U.S. Cl.
CPC .............. *F16K 47/14* (2013.01); *F16K 3/246* (2013.01); *F16K 47/08* (2013.01)

(58) Field of Classification Search
CPC .......................... F16K 47/14; Y10T 137/86734
USPC ...................................................... 137/625.3
See application file for complete search history.

(56) References Cited

U.S. PATENT DOCUMENTS

| | | | | |
|---|---|---|---|---|
| 3,693,659 A | * | 9/1972 | Parola | F16K 3/22 137/625.3 |
| 3,722,854 A | * | 3/1973 | Parola | F16K 47/08 137/625.3 |
| 4,041,982 A | * | 8/1977 | Lindner | F16K 47/08 137/625.3 |
| 4,108,210 A | * | 8/1978 | Luthe | F16K 47/08 137/625.3 |
| 5,014,746 A | * | 5/1991 | Heymann | F16K 47/08 137/625.3 |
| 6,766,826 B2 | * | 7/2004 | Baumann | F16K 47/08 137/625.3 |

(Continued)

FOREIGN PATENT DOCUMENTS

| | | |
|---|---|---|
| DE | 2439225 A1 | 2/1976 |
| EP | 3009723 A1 | 4/2016 |

(Continued)

OTHER PUBLICATIONS

Search Report for International application No. PCT/US2017/056839, dated Jan. 30, 2018.

(Continued)

*Primary Examiner* — Eric Keasel
(74) *Attorney, Agent, or Firm* — Marshall, Gerstein & Borun LLP

(57) ABSTRACT

A fluid valve includes a valve body having a fluid inlet and a fluid outlet. A fluid passageway connects the fluid inlet and the fluid outlet. A trim assembly is located within the fluid passageway and the trim assembly cooperates with a control member to control fluid flow through the fluid passageway. The trim assembly includes a cage having a lattice structure.

18 Claims, 5 Drawing Sheets

(56) References Cited

U.S. PATENT DOCUMENTS

| | | | | |
|---|---|---|---|---|
| 7,789,105 B2* | 9/2010 | Zecchi | ............... | F16K 47/08 |
| | | | | 137/625.33 |
| 8,033,300 B2* | 10/2011 | McCarty | ............ | F16K 47/08 |
| | | | | 137/625.3 |
| 8,950,431 B2* | 2/2015 | Kim | ............ | F16K 47/08 |
| | | | | 137/625.33 |
| 9,528,632 B2* | 12/2016 | Glaun | ............... | F16K 47/04 |
| 9,587,764 B2* | 3/2017 | Juhnke | ............... | F16K 47/08 |
| 2015/0108379 A1* | 4/2015 | Juhnke | ............... | F16K 3/34 |
| | | | | 251/127 |

FOREIGN PATENT DOCUMENTS

| | | |
|---|---|---|
| JP | S4736425 U | 12/1972 |
| JP | 2004028195 A | 1/2004 |

OTHER PUBLICATIONS

Written Opinion for International application No. PCT/US2017/056839, dated Jan. 30, 2018.

* cited by examiner

LATTICE CONTROL CAGE FOR A REGULATOR

FIELD OF THE DISCLOSURE

The disclosure relates generally to fluid valves and, more particularly, to trim assemblies that include a lattice control cage.

BACKGROUND

Control valves are commonly used in process plants to control the flow of a fluid (e.g., a gas, a liquid, etc.) or any other substance through pipes and/or vessels to which they are connected. A control valve is typically composed of one or more inlets and outlets, and includes a fluid control element or member (e.g., a valve gate, a piston, a valve plug, a control member, etc.) that operates to control fluid flow through apertures that fluidly couple the inlet(s) to the outlet(s). A control member is typically coupled to a valve bonnet that is mechanically coupled (e.g., bolted, clamped, threaded into, etc.) to the valve body. Typically, the control member is configured to engage a sealing structure (e.g., a valve seat) that encompasses a flow path through the valve. A regulator is a self-controlling form of a control valve.

Generally speaking the control elements (including the fluid control member, the seat, and a cage) are known as "valve trim" or "trim assembly" in the art. In some cases it may be desirable to characterize fluid as it flows through the valve, for example, to reduce pressure. In these cases, a trim assembly may be used that includes a cage with a plurality of openings that are drilled, cast, punched, machined etc., through a wall of the cage. The openings may be sized and shaped to characterize fluid flow as the fluid flows through the openings in the cage, for example by decreasing pressure as the fluid moves through the valve trim. This characterization or pressure reducing process generates unwanted noise. Currently, cavitation is controlled by using pressure drops and sound reduction is done by cages having a plurality of holes drilled, cast, punched, machined, etc., into a cage wall.

SUMMARY

In accordance with a first exemplary aspect, a fluid valve includes a valve body having a fluid inlet and a fluid outlet. A fluid passageway connects the fluid inlet and the fluid outlet. A trim assembly is located within the fluid passageway and the trim assembly cooperates with a control member to control fluid flow through the fluid passageway. The trim assembly includes a cage having a lattice structure.

In accordance with a second exemplary aspect, a trim assembly for a fluid control valve has a cage that includes a lattice structure formed in a cage wall, the lattice structure comprising a plurality of structural elements that form a pattern of openings.

In further accordance with any one or more of the foregoing first, second, or third aspects, a fluid valve or a trim assembly may further include any one or more of the following preferred forms.

In one preferred form, the lattice structure includes a plurality of structural elements that form a pattern of openings.

In another preferred form, the openings are one of diamond-shaped, square-shaped, round-shaped, and sphere-shaped.

In another preferred form, the shape of the openings may vary across any dimension of the lattice structure.

In another preferred form, the structural elements are oriented perpendicular to and parallel to a longitudinal axis of the cage.

In another preferred form, the structural elements are oriented at 45 degree angles relative to the longitudinal axis of the cage.

In another preferred form, the lattice structure has a uniform lattice density.

In another preferred form, the lattice structure has a non-uniform lattice density, the non-uniformity varying across any one or more dimensions of the lattice structure.

In another preferred form, the lattice structure has a lattice density that changes along a longitudinal axis of the cage.

In another preferred form, the lattice structure has a lattice density that changes in a radial direction, along a thickness of the cage wall.

In another preferred form, a filter is disposed adjacent to the lattice structure, the filter including a plurality of openings that are smaller than the plurality of openings in the lattice structure.

In another preferred form, the filter is printed adjacent to the lattice structure.

In another preferred form, the filter is inserted adjacent to the lattice structure, the filter extending into the cage wall.

In yet another preferred form, the lattice structure itself may act as a filter.

DETAILED DESCRIPTION

Figure 1:
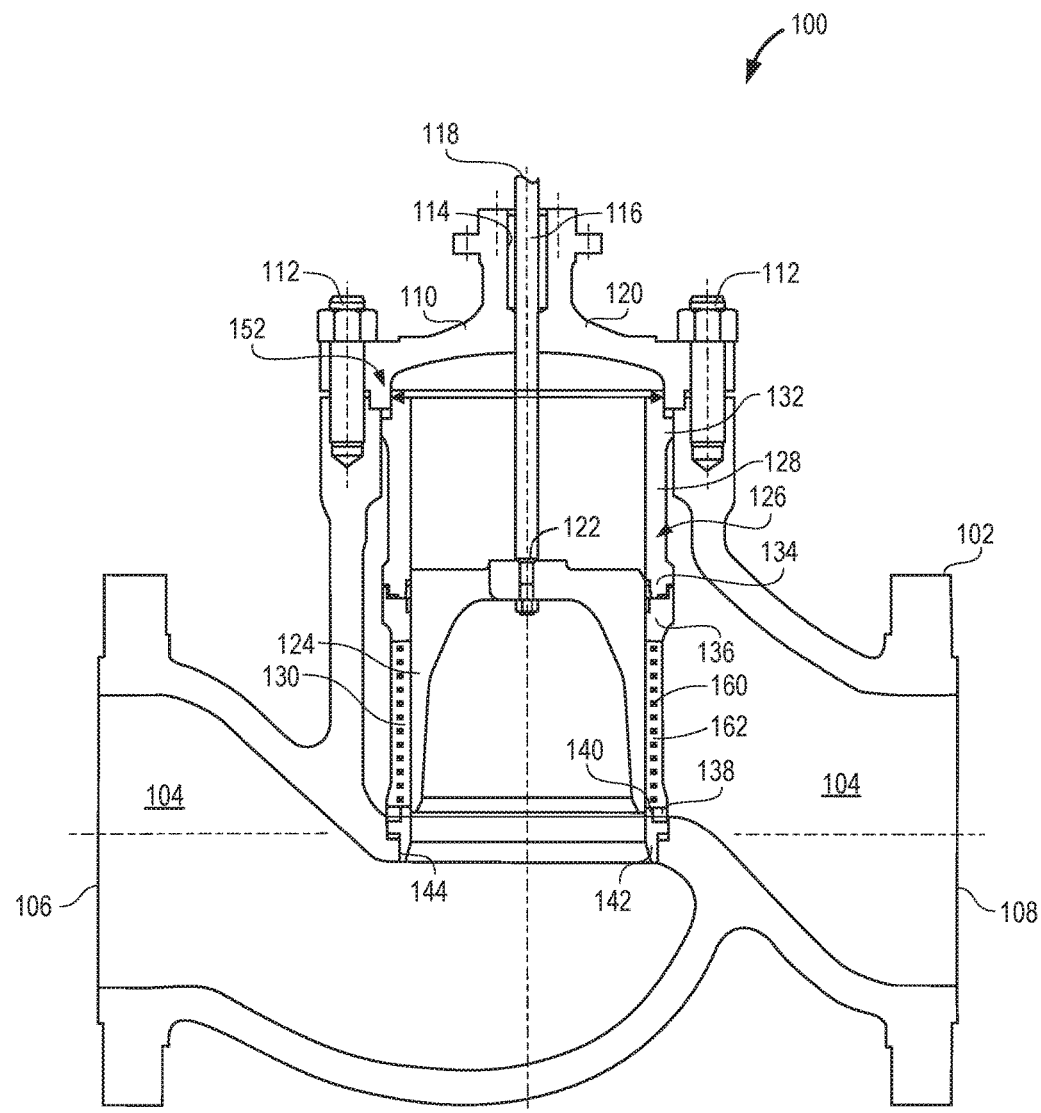
FIG. 1 illustrates a cross-sectional view of a fluid control valve constructed in accordance with the teachings of the disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The examples described herein relate to fluid control valves having a trim assembly that includes a cage having a lattice structure. Such cage lattice structures allow the trim assembly to control cavitation and flow characteristics (and thus noise) by wake, pressure drop, and bubble nuclei generation. The examples described herein substantially reduce the amount of noise generated by the trim assembly, which extends the useful life of valve components.

Furthermore, the cage lattice structures may be manufactured with additive or non-standard manufacturing techniques, such as 3D printing, which allows the cages to be custom produced if needed and delivered quickly. Standard manufacturing techniques are subtractive techniques, such as drilling, machining, punching, and casting. Moreover, the cage lattice structures provide more structural support for a given open area than conventional cages. Still further, the cage lattice structures eliminate the no-flow areas needed by conventional cages that have windows. The cage lattice structures described below are customizable to optimize strength, opening speed, linear flow, hybrid linear quick-open flow, cavitation reduction, noise reduction, and material reduction, while at the same time the lattice density (or lattice density gradient) may be varied across the lattice structure to simulate a quick-opening, linear, or hybrid flow response.

A regulator is a self-controlling form of a control valve and the disclosed lattice structures may be applied equally to control valves and to regulators. For the purposes of this patent, the terms "control valve" and "regulator" may be used interchangeably.

As used herein, the term "lattice structure" is defined to include a plurality of diagonal (or horizontal and vertical) structural elements that form a plurality of diamond, square-shaped, round, or spherical openings in a pattern. The plurality of structural elements may be separate elements, or the elements may be joined together (or formed together) so make an integral structure having a lattice pattern.

As used herein, the term "lattice density" is defined to include the amount of open space in the lattice structure that is available for fluid flow for a given square millimeter. For example, lattice density may include values between 0.3 $mm^2$ per square mm and 0.6 $mm^2$ per square mm. On a percentage basis, the lattice density above may be stated as 30% open area to 60% open area. In such lattice density values, the structure of the lattice would take up the remaining 0.7 $mm^2$ to 0.4 $mm^2$, respectively. Generally, lattice densities between 1% and 99% are possible in the lattice structures described below.

As used herein, the term "lattice density gradient" is defined to include the rate of change in the lattice density across a certain spatial dimension. For example, the lattice density may change across a thickness of the lattice structure or across a height of the lattice structure. The rate of such change is defined as the "lattice density gradient."

FIG. 1 illustrates an example fluid valve 100 that has a valve body 102 including a fluid flow passageway 104 between an inlet 106 and an outlet 108. A bonnet 110 is coupled to the valve body 102 via a plurality of fasteners 112 and includes a bore 114 to receive a stem 116. An end 118 of the stem 116 extends from a bonnet body 120 and is operatively coupled to an actuator (not shown), and an opposite end 122 of the stem 116 is coupled to a control member 124 (e.g., a valve plug).

As used herein, a valve trim assembly 126 of the example fluid valve 100 includes a cage retainer 128 (e.g., an upper cage retainer or guide), a cage 130, and a seat 142. In the embodiments illustrated in the figures, the cage retainer 128 and the cage 130 are illustrated as separate and distinct structural elements. In other embodiments, the cage 130 and the cage retainer 128 may be formed as a single unitary structural element.

Generally, an end 132 of the cage retainer 128 is positioned at least partially within the valve body 102 and adjacent the bonnet 110 and an opposing end 134 of the cage retainer 128 engages an end 136 of the cage 130 such that the cage retainer 128 and the cage 130 are coaxially aligned. The cage 130 is positioned within the valve body 102 such that opposing steps or shoulders 138 and 140 of the cage 130 and the seat 142 (e.g., a seat ring) engage and/or interlock to secure the seat 142 at least partially within an aperture 144 of the valve body 102. Such an approach eliminates the need for a plurality of fasteners to secure the seat 142 relative to the valve body 102 and, thus, the distortion caused, in some instances, when coupling a seat ring to a valve body. Additionally, by eliminating the need for a plurality of fasteners to secure the seat 142, the seat 142 may be more easily removed from and/or assembled within the example fluid valve 100 during, for example, routine maintenance. In other embodiments, the cages 130 described herein may be used in valves without a cage retainer 128 and/or with an integrally formed cage retainer 128.

The cage 130 includes a lattice structure 160 formed in a central portion of the cage 130. The lattice structure 160 includes a plurality of openings 162 that allow fluid to flow through the cage 130. The lattice structure 160 forms part of a cage wall 164. The lattice structure 160 will be described further below.

In one example, the cage retainer 128, the seat 142, the valve body 102 and/or any other valve components, may include a dynamic joint 152. In other embodiments, the dynamic joint 152 may be eliminated and the cage retainer 128 may be directly coupled to the bonnet 110. Where the dynamic joint 152 is included, it allows the cage 130 and the cage retainer 128 to expand/contract (e.g., in response to thermal cycles) while enabling the cage 130 to remain in contact with the seat 142 to maintain the seat 142 in sealing engagement with the aperture 144.

The trim assembly 126 cooperates with the control member 124 to control fluid flow through the fluid passageway 104, the trim assembly 126 includes the cage 130 and the cage retainer 128. In some embodiments, the trim assembly 126 may also include the seat 142.

Figure 2:
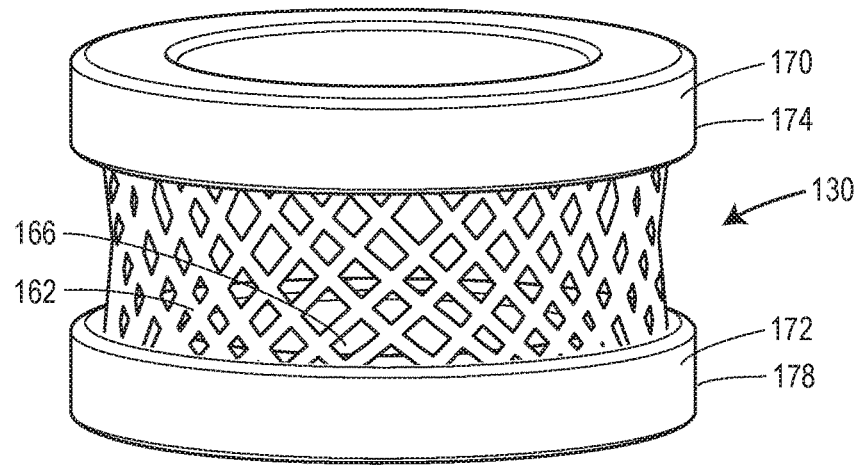
FIG. 2 illustrates a perspective view of a cage of a trim assembly of the fluid control valve of FIG. 1, the cage having a lattice structure.
Figure 3:
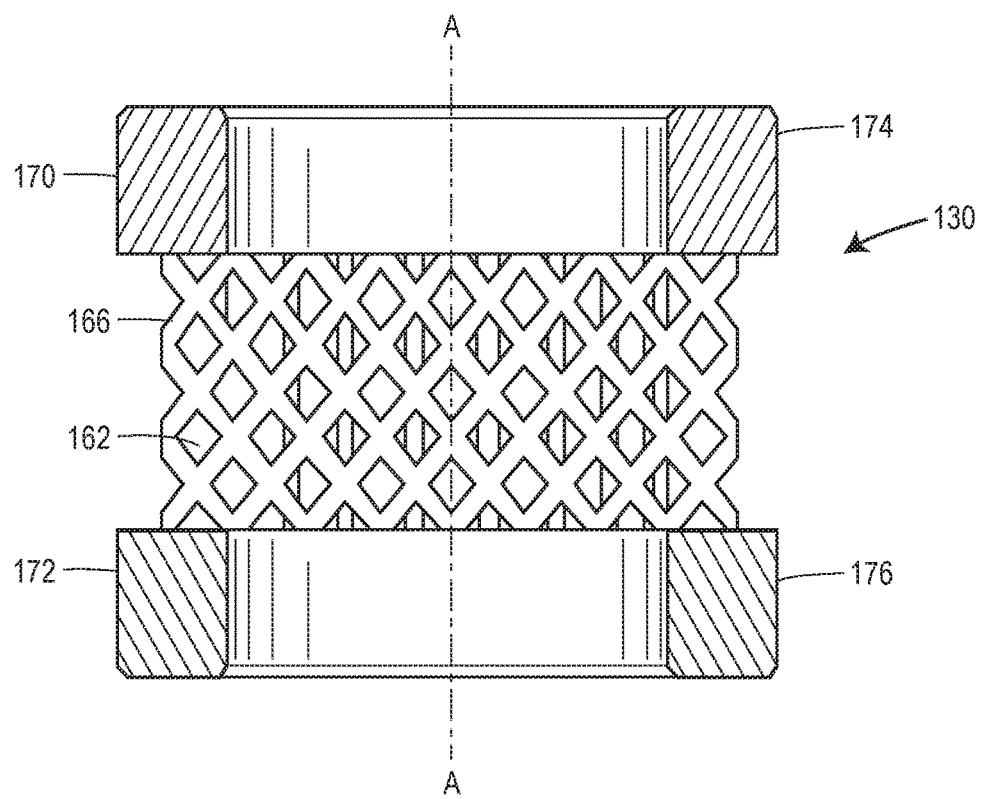
FIG. 3 illustrates a cross-sectional view of the cage of FIG. 2.

As illustrated in FIGS. 2 and 3, the lattice structure 160 includes a plurality of structural elements 166 that form a pattern of openings 162. The openings may be diamond-shaped or square-shaped, as illustrated. In other embodiments, the openings may have other shapes. The structural elements 166 are oriented at 45 degree angles relative to a longitudinal axis A of the cage in the embodiment of FIGS. 2 and 3.

The lattice structure 160 is located between a first or upper cage ring 170 and a second or lower cage ring 172, the lattice structure 160 forming part of the cage wall 164. The lattice structure 160 may be recessed radially inward from an exterior edge 174 of the first cage ring 170 and/or from an exterior edge 176 of the second cage ring 172. In some embodiments, the lattice structure 160 may be joined to the first cage ring 170 and to the second cage ring 172 with a radius or fillet. The radius reduces stress between the lattice structure 160 and between the first and second cage rings 170, 172.

Figure 4:
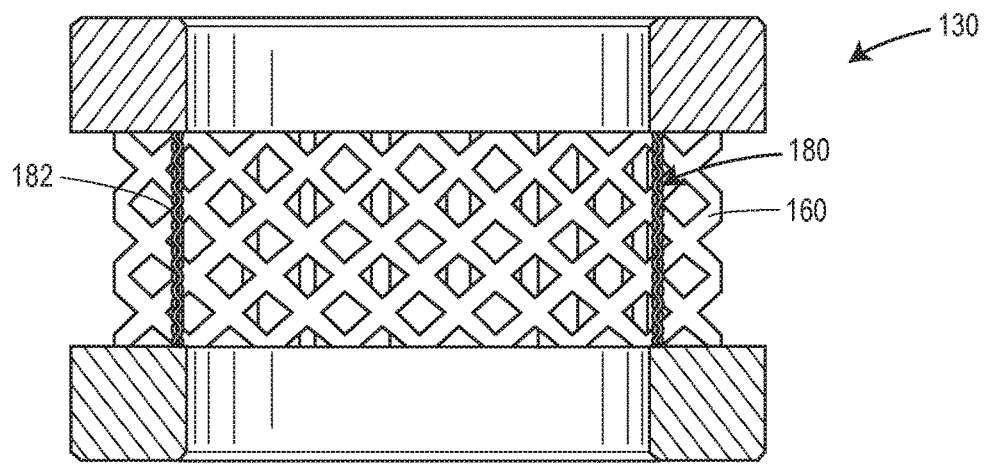
FIG. 4 illustrates a cross-sectional view of second embodiment of a cage of a trim assembly of the fluid control valve of FIG. 1, the cage having a printed inner filter.

In other embodiments, for example in FIG. 4, a filter 180 may be disposed adjacent to the lattice structure 160. The filter 180 is located on an upstream side of the lattice structure 160 to prevent any large particles from entering the lattice structure 160, which could damage the lattice structure 160. In the embodiment of FIG. 4, the filter 180 is located radially inward of the lattice structure. The filter 180 includes a plurality of openings 182. The openings in the plurality of openings 182 are smaller than the openings 162 in the lattice structure 160. In the embodiment of FIG. 4, the filter 180 is printed adjacent to the lattice structure 160 by a 3D printing technique.

Figure 5:
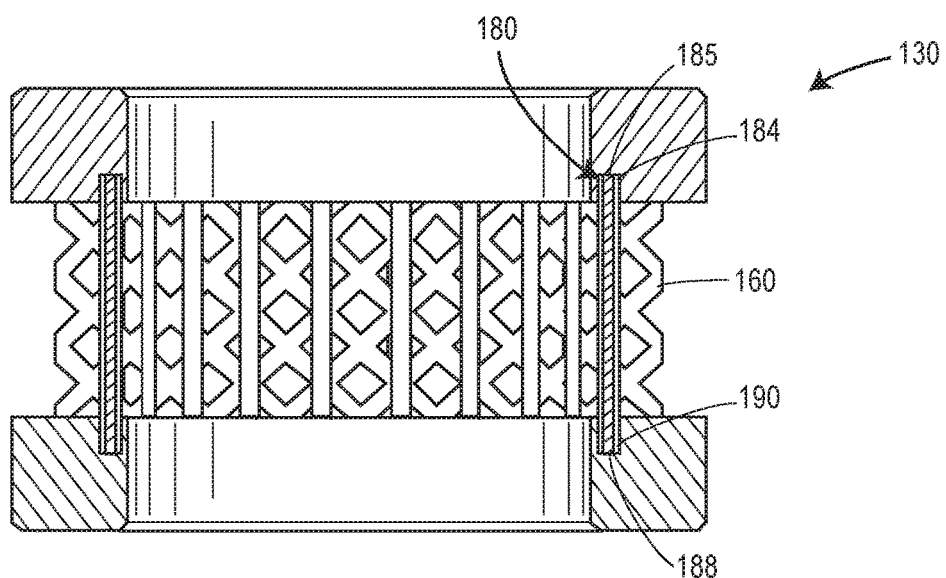
FIG. 5 illustrates a cross-sectional view of third embodiment of a cage of a trim assembly of the fluid control valve of FIG. 1, the cage having a trapped inner filter.

In yet other embodiments, for example in FIG. 5, the filter 180 may be inserted into the cage 130 adjacent to the lattice structure 160. The filter 180 extends into first and second cage rings 170, 172. More specifically, a first end of the filter 184 may be located within a channel 186 formed in the first cage ring 170 and a second end of the filter 188 may be located within a channel 190 of the second cage ring 172. The channels 186, 188 positively retain the filter 180 within the cage 130.

In yet other embodiments, the lattice density and/or lattice density gradient may be customized to act as both a flow characteristic control and as a filter.

Figure 6:
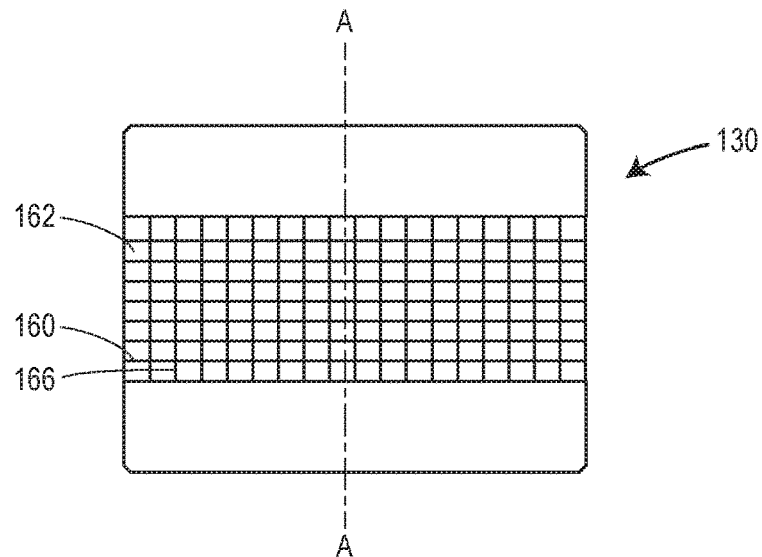
FIG. 6 illustrates a plan view of a fourth embodiment of a cage of a trim assembly of the fluid control valve of FIG. 1, the lattice structure having uniform lattice density.

Turning now to FIG. 6, in one embodiment, the lattice structure 160 may include the structural elements 166, which are oriented perpendicular to and parallel to the longitudinal axis A of the cage 130. In the embodiment of FIG. 6, the lattice structure has a uniform lattice density. In other words, the openings 162 are uniform in size and shape, and the openings 162 are uniformly spaced about the lattice structure 160.

Figure 7:
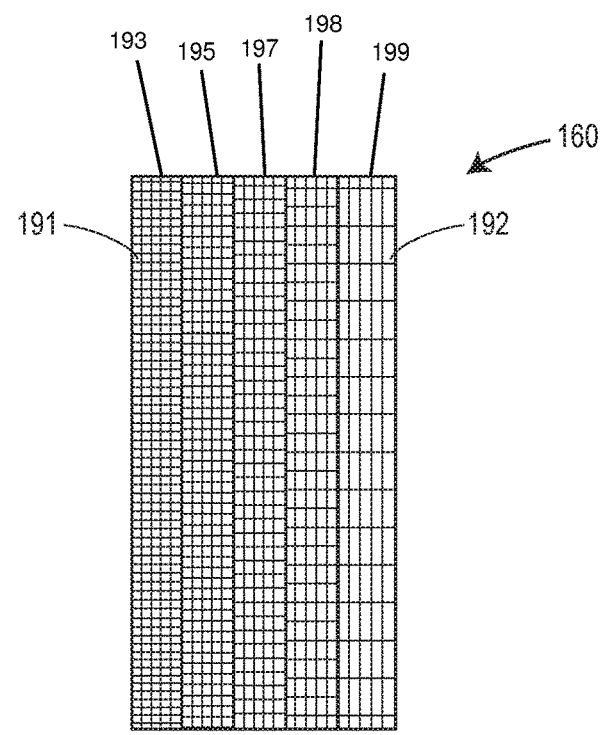
FIG. 7 illustrates a plan view of a fifth embodiment of a cage of a trim assembly of the fluid control valve of FIG. 1, the lattice structure having a lattice that differs in density through a thickness of the cage.

Turning now to FIG. 7, in one embodiment, the lattice structure 160 may include a non-uniform lattice density. More specifically, the lattice density changes from an inner surface 191 to an outer surface 192 (i.e., along a thickness of the lattice structure 160, radially from inside the cage 130 to outside of the cage 130). In the embodiment of FIG. 7, the lattice structure 160 is most dense (i.e., has the least open area per mm$^2$) at the inner surface 191 and the lattice structure 160 is the least dense (i.e., has the most open area per mm$^2$) at the outer surface 192. For example, in one embodiment, the lattice structure 160 may have a density of about 0.3 mm open area per mm$^2$ at the inner surface 191 and a density of about 0.60 mm open area per mm$^2$ at the outer surface 192. For this example, on a percentage basis, the lattice structure 160 may have a density of about 30% open area at the inner surface 191 and about 60% open area at the outer surface 192. In the embodiment illustrated in FIG. 7, the lattice density changes in discrete sections. In a first section 193, the lattice density is about 30%. In a second section 195, the lattice density is about 37.5%. In a third section 197, the lattice density is about 45%. In a fourth section 198, the lattice density is about 52.5%. In a fifth section 199, the lattice density is about 60%.

While certain lattice densities are illustrated in FIG. 7, the lattice structure 160 in other embodiments may include any range of lattice densities between 1% and 99%. While the lattice density is illustrated in FIG. 7 as changing in discrete sections, in other embodiments, the lattice density may change continuously and smoothly from the inner surface 191 to the outer surface 192. While the lattice density is illustrated in FIG. 7 to be the most dense near the inner surface 191 and the least dense near the outer surface 192, in other embodiments, the lattice density may be least dense near the inner surface 191 and most dense near the outer surface 192. In yet other embodiments, the lattice density may increase and decrease one or more times across a thickness of the lattice structure 160. For example, the lattice density may be most dense at a location somewhere between the inner surface 191 and the outer surface 192.

The lattice density gradient across the lattice structure 160 may be linear or non-linear. The embodiment of FIG. 7, with non-uniform lattice density, reduces cavitation more effectively than current cages because the non-uniform lattice density reduces cavitation in three different ways simultaneously. First, the non-uniform lattice density reduces cavitation by reducing pressure. Second, the non-uniform lattice density reduces cavitation by controlling wake behavior. Third, the non-uniform lattice density reduces cavitation by triggering nuclei formation. As a result, the lattice structure 160 is very effective in reducing cavitation.

Figure 8:
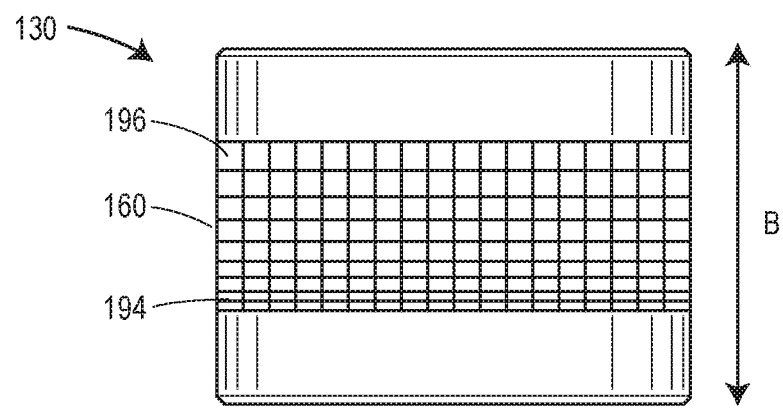
FIG. 8 illustrates a plan view of a sixth embodiment of a cage of a trim assembly of the fluid control valve of FIG. 1, the lattice structure having a lattice that differs in density along a height of the cage.

Turning now to FIG. 8, in one embodiment, the lattice structure 160 may include a non-uniform lattice density, similar to the embodiment of FIG. 7. However, the embodiment of FIG. 8 includes non-uniform lattice density in the axial (longitudinal) direction B. For example, the lattice density changes from a bottom edge 194 to an upper edge 196 (i.e., along a height of the lattice structure 160, from bottom to top). In the embodiment of FIG. 8, the lattice structure 160 is most dense (i.e., has the least open area per mm$^2$) near the bottom edge 194 and the lattice structure 160 is the least dense (i.e., has the most open area per mm$^2$) at near the top edge 196.

The lattice structure 160 in other embodiments may include any range of lattice densities between 1% and 99%. While the lattice density is illustrated in FIG. 8 as changing continuously and smoothly, in other embodiments, the lattice density may change in discrete sections from the bottom edge 194 to the upper edge 196. While the lattice density is illustrated in FIG. 8 to be the most dense near the bottom edge 194 and the least dense near the upper edge 196, in other embodiments, the lattice density may be least dense near the bottom edge 194 and most dense near the upper edge 196. In yet other embodiments, the lattice density may increase and decrease one or more times across a height of the lattice structure 160. For example, the lattice density may be most dense at a location somewhere between the bottom edge 194 and the upper edge 196.

The embodiment of FIG. 8 is more effective at reducing cavitation than conventional cages for the same reasons as the embodiment of FIG. 7. The embodiment of FIG. 8, however, produces different flow characteristics based on the location of the plug (e.g., how open or closed is the valve).

Figure 9:
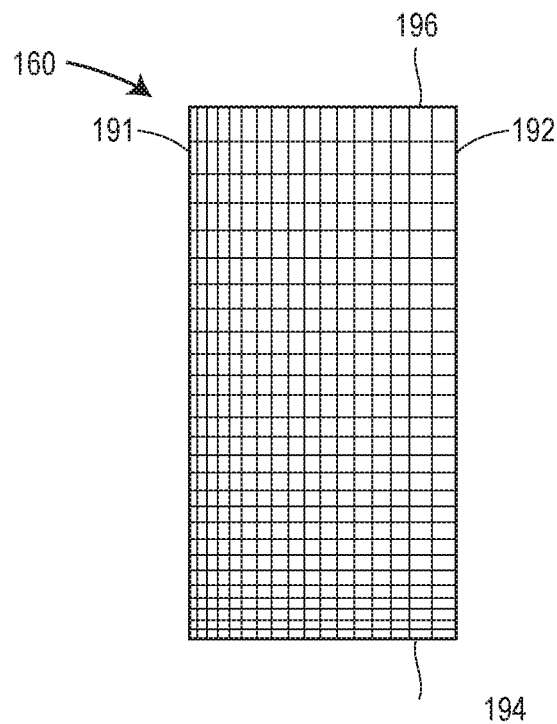
FIG. 9 illustrates a plan view of a seventh embodiment of a cage of a trim assembly of the fluid control valve of FIG. 1, the lattice structure having a lattice that differs in density through a thickness of the cage and along a height of the cage.

Turning now to FIG. 9, in one embodiment, the lattice structure 160 may include a non-uniform lattice density, similar to the embodiments of FIGS. 7 and 8. However, the embodiment of FIG. 9 includes non-uniform lattice density in both the axial direction B and in the radial direction (inside out). For example, the lattice density changes from the bottom edge 194 to the upper edge 196 (i.e., along a height of the lattice structure 160, from bottom to top) and also from the inner surface 191 to the outer surface 192. In the embodiment of FIG. 9, the lattice structure 160 is most dense (i.e., has the least open area per mm$^2$) near the intersection of the bottom edge 194 and the inner surface 191 and the lattice structure 160 is the least dense (i.e., has the most open area per mm²) near the intersection of the top edge 196 and the outer surface 192.

The lattice structure 160 in other embodiments may include any range of lattice densities between 1% and 99%. While the lattice density is illustrated in FIG. 9 as changing continuously and smoothly, in other embodiments, the lattice density may change in discrete sections from the bottom edge 194 to the upper edge 196 and from the inner surface 191 to the outer surface 193. While the lattice density is illustrated in FIG. 9 to be the most dense near the bottom edge 194 and near the inner surface 191 and the least dense near the upper edge 196 and near the outer surface 192, in other embodiments, the lattice density may be least dense near the bottom edge 194 and near the inner surface 191 and most dense near the upper edge 196 and near the outer surface 192. In yet other embodiments, the lattice density may increase and decrease one or more times across a height and radius of the lattice structure 160. For example, the lattice density may be most dense at a location somewhere between the bottom edge 194 and the upper edge 196 and between the inner surface 191 and the outer surface 192.

The embodiment of FIG. 9 is more effective at reducing cavitation than conventional cages for the same reasons as the embodiments of FIGS. 7 and 8. The embodiment of FIG. 9, however, combines advantages of both the embodiment of FIG. 7 and the embodiment of FIG. 8.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A fluid valve comprising:
   a valve body having a fluid inlet and a fluid outlet;
   a fluid passageway connecting the fluid inlet and the fluid outlet;
   a trim assembly located within the fluid passageway, the trim assembly cooperating with a control member to control fluid flow through the fluid passageway, the trim assembly including a cage having a first cage ring and a second cage ring separated by a lattice structure, the lattice structure forming part of a cage wall, the lattice structure being recessed radially inward from an exterior edge of the first cage ring and from an exterior edge of the second cage ring,
   wherein a filter is disposed in the cage wall upstream of the lattice structure, the filter including a plurality of openings that are smaller than a plurality of openings in the lattice structure.

2. The fluid valve of claim 1, wherein the plurality of openings in the lattice structure are formed by a plurality of structural elements.

3. The fluid valve of claim 2, wherein the openings are one of diamond-shaped and square-shaped.

4. The fluid valve of claim 2, wherein the structural elements are oriented perpendicular to and parallel to a longitudinal axis of the cage.

5. The fluid control valve of claim 2, wherein the structural elements are oriented at 45 degree angles relative to the longitudinal axis of the cage.

6. The fluid control valve of claim 2, wherein the lattice structure has a uniform lattice density.

7. The fluid control valve of claim 2, wherein the lattice structure has a non-uniform lattice density.

8. The fluid control valve of claim 7, wherein the lattice structure has a lattice density that changes along a longitudinal axis of the cage.

9. The fluid control valve of claim 7, wherein the lattice structure has a lattice density that changes in a radial direction, along a thickness of the cage wall.

10. The fluid control valve of claim 1, wherein the filter is printed adjacent to the lattice structure.

11. The fluid control valve of claim 1, wherein the filter is inserted adjacent to the lattice structure, the filter extending into the cage wall.

12. A trim assembly for a fluid control valve, the trim assembly comprising:
    a cage having a first cage ring and a second cage ring separated by a lattice structure, the lattice structure forming part of a cage wall, the lattice structure being recessed radially inward from an exterior edge of the first cage ring and from an exterior edge of the second cage ring, and
    a seat, the seat being located adjacent to the cage,
    wherein the lattice structure comprises a plurality of structural elements that form a pattern of openings, and a filter disposed in the cage wall upstream of the lattice structure, the filter including a plurality of openings that are smaller than the openings in the pattern of openings.

13. The trim assembly of claim 12, wherein the openings are one of diamond-shaped and square-shaped.

14. The fluid valve of claim 12, wherein the structural elements are oriented perpendicular to and parallel to a longitudinal axis of the cage.

15. The fluid control valve of claim 12, wherein structural elements are oriented at 45 degree angles relative to the longitudinal axis of the cage.

16. The fluid control valve of claim 12, wherein the lattice structure has a uniform lattice density.

17. The fluid control valve of claim 12, wherein the lattice structure has a non-uniform lattice density.

18. The fluid control valve of claim 17, wherein the lattice structure has a lattice density that changes along a longitudinal axis of the cage or in a radial direction, along a thickness of the cage wall.

* * * * *

UNITED STATES PATENT AND TRADEMARK OFFICE
CERTIFICATE OF CORRECTION

| | |
|---|---|
| PATENT NO. | : 10,359,128 B2 |
| APPLICATION NO. | : 15/331394 |
| DATED | : July 23, 2019 |
| INVENTOR(S) | : James L. Griffin, Jr. et al. |

It is certified that error appears in the above-identified patent and that said Letters Patent is hereby corrected as shown below:

In the Drawings

In Fig. 5, Sheet 3 of 5, delete reference character "185" and insert reference character -- 186 --.

In the Specification

In Column 2, Line 34, delete "disclosure;" and insert -- disclosure. --.

In Column 5, Line 25, delete "186, 188" and insert -- 186, 190 --.

In Column 7, Line 9, delete "outer surface 193." and insert -- outer surface 192. --.

In the Claims

In Column 8, Line 6, in Claim 5, delete "fluid control valve" and insert -- fluid valve --.

In Column 8, Line 9, in Claim 6, delete "fluid control valve" and insert -- fluid valve --.

In Column 8, Line 11, in Claim 7, delete "fluid control valve" and insert -- fluid valve --.

In Column 8, Line 13, in Claim 8, delete "fluid control valve" and insert -- fluid valve --.

In Column 8, Line 16, in Claim 9, delete "fluid control valve" and insert -- fluid valve --.

In Column 8, Line 19, in Claim 10, delete "fluid control valve" and insert -- fluid valve --.

In Column 8, Line 21, in Claim 11, delete "fluid control valve" and insert -- fluid valve --.

In Column 8, Line 40, in Claim 14, delete "fluid valve" and insert -- trim assembly --.

Signed and Sealed this
Fourteenth Day of April, 2020

Andrei Iancu
*Director of the United States Patent and Trademark Office*